Sept. 16, 1941.   K. E. KYLÉN   2,256,437
COMBUSTION MOTOR
Filed July 31, 1939   2 Sheets-Sheet 2

Inventor:
Karl Erik Kylén
by his Attorneys
Howson & Howson

Patented Sept. 16, 1941

2,256,437

UNITED STATES PATENT OFFICE 2,256,437

COMBUSTION MOTOR

Karl Erik Kylén, Goteborg, Sweden

Application July 31, 1939, Serial No. 287,649
In Sweden August 15, 1938

6 Claims. (Cl. 123—73).

The present invention relates to combustion motors of the two-stroke type having one or more selfacting inlet valves for putting a distributing chamber in communication with the top of the cylinder, and exhaust ports in the cylinder wall. The purpose of the invention is to provide a construction, in which the selfacting valves open and close speedily and to accelerate the scavenging operation so that motors of this type may be able to work at high speeds with good efficiency and fuel economy. It also makes it possible to use motors of the type in question at variable speeds, for instance within speed ranges occurring in motor cars or motor cycles.

Selfacting or automatic valves have hitherto been considered unsuitable for use as inlet valves for combustion motors, as they do not open and close speedily enough for motors running at high speeds, and positively controlled valves are therefore now generally used. For practical and economic reasons a sufficiently high scavenging pressure enabling the scavenging to take place at sufficient high speed cannot be used, if the pressure prevailing in the distributing chamber is to accomplish unaided both the opening of the valves and the scavenging.

The motor according to the invention is characterized thereby that the distributing chamber for the inlet valve or valves is connected to a compressor device or a scavenging pump, the exhaust conduit of the motor being connected to the exhaust ports, and the exhaust conduit being so proportioned as to cause oscillation in the exhaust gases creating a partial vacuum in the cylinder after the inlet valves have commenced to open under the action of the prevailing overpressure in the distributing chamber relative to the pressure in the cylinder. The kinetic energy of the exhaust gases can therefore be more speedily and better utilized for the scavenging proper. When the exhaust gases flowing away through the exhaust conduit commence causing a partial vacuum in the cylinder, the latter is already in communication with the distributing chamber. The valves are then wholly or partly open and none of the kinetic energy of the exhaust gases or at the most only an insignificant part thereof need be used for opening the valves. When using the kinetic energy of the exhaust gases for scavenging, it is possible to dimension the valve springs heavier, whereby the valves close more rapidly.

Figure 1:
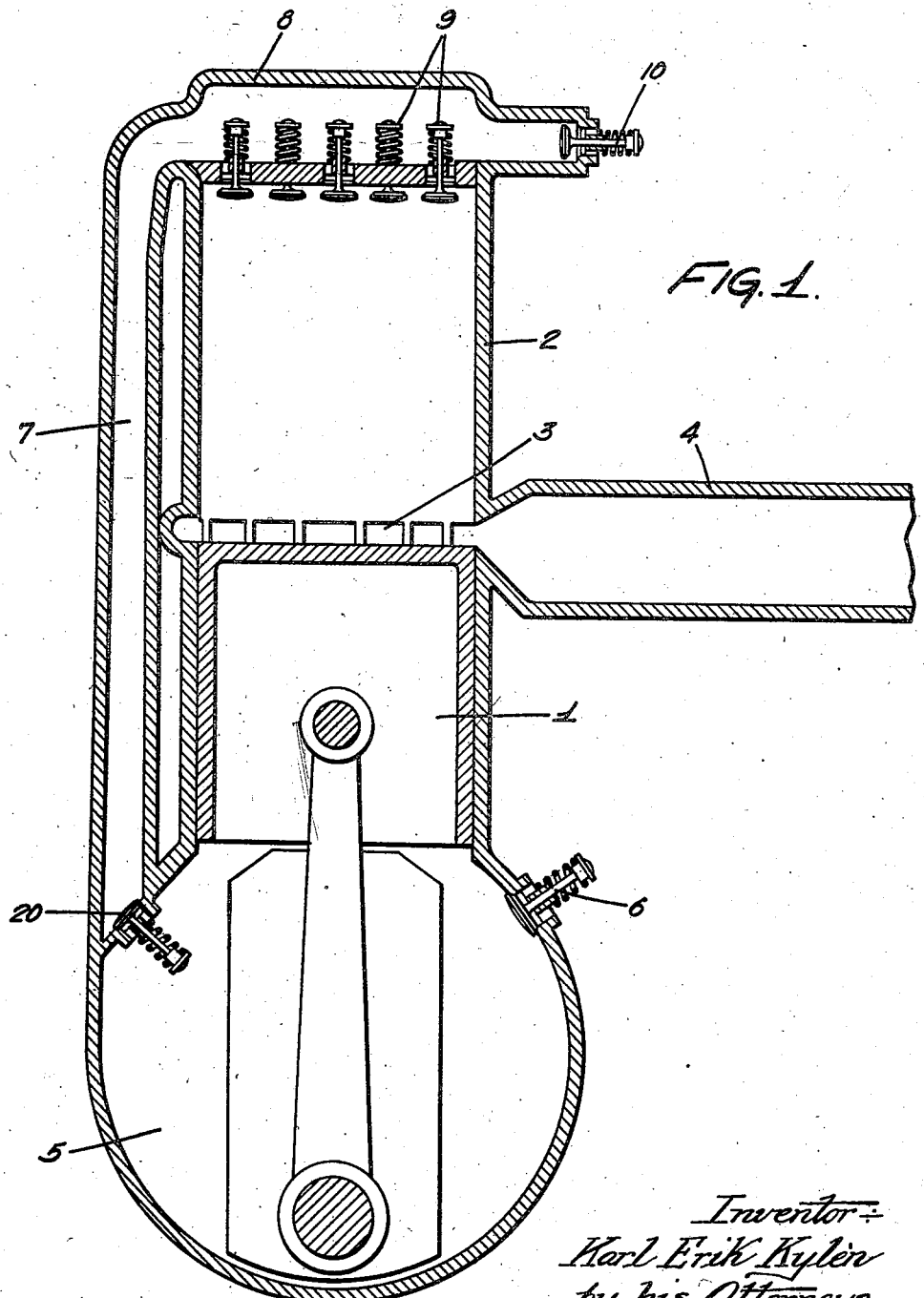
Figure 2:
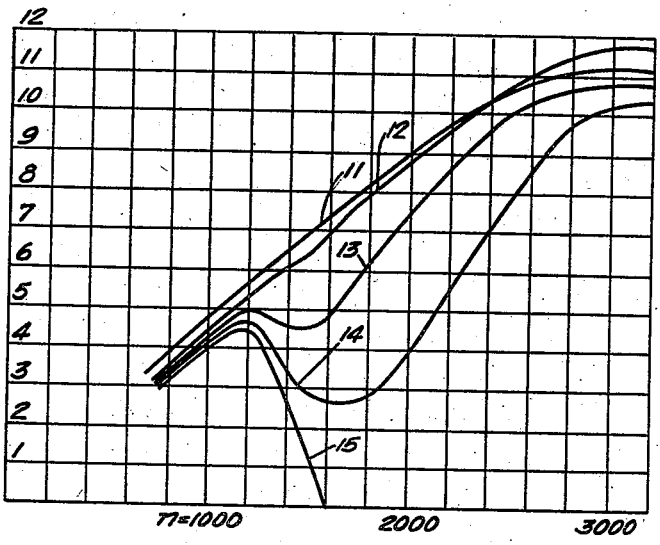
Figure 3:
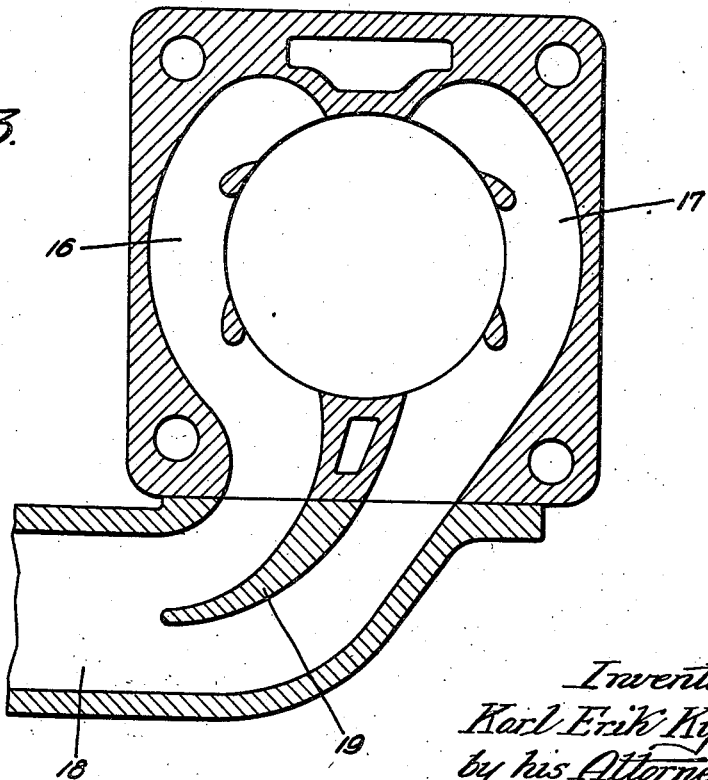

The invention is explained in connection with the accompanying drawings, in which Fig. 1 shows schematically the invention embodied in a motor;

Fig. 2 shows brake efficiency curves obtained with motors of the type according to the invention, and Fig. 3 is an embodiment of the exhaust conduit connecting piece, which has been found convenient for the purpose of the invention.

When the piston 1 in the embodiment of the invention shown in Fig. 1 is on its downward stroke in the cylinder 2 and commences to lay free the exhaust ports 3 in the cylinder, the gas pressure in the cylinder decreases very rapidly, as the exhaust gases flow out into the exhaust conduit 4, which is directly connected to the ports of the cylinder wall. The crank case 5 is arranged as a compressor or scavenging pump. During the upward stroke of the piston gas or air mixture is sucked in through the valve 6, and during the downward stroke introduced into the distributing chamber 8 for the valves 9 through the inlet conduit 7 and through valve 20. The valves 9 are selfacting and open as soon as the superpressure in the distributing chamber is greater than the spring tension. The valves 9 are made as light as possible in order to open rapidly under the action of the gas pressure in the distributing chamber. When the combustion gases flow through the exhaust conduit, they cause a vacuum in the cylinder owing to their kinetic energy. This vacuum is formed only after the valves have wholly or partly opened. Through the vacuum caused in the cylinder the scavenging is considerably accelerated because of the increased speed of the gas through the valves.

The exhaust ports are so dimensioned that the substantial part of their area is covered by the piston, when the combustion gases tend to return to the cylinder owing to the vacuum therein. The outlet conduit 4 has a diameter and length suitable for each particular length of stroke of the piston.

The less the total volume of the crank case 5, the connecting channel 7 and the distributing chamber 8, or the less the total volume of the connecting channel 7 alone and the distributing chamber 8, when the crank case is designed as compressor with a selfacting outlet valve or a controlled regulating arrangement for governing the exhaust of the air or gas mixture from the crank case, the higher will be the pressure in the distributing chamber and the speedier the valves will open and the quicker will the whole scavenging procedure take place. The scavenging operation may even take place so rapidly that a partial vacuum may be caused in the distributing chamber or the connecting channel at certain speeds and loads. The quantity of air or gas introduced can therefore be increased, if a valve 10 (Fig. 1) is provided in the distributing chamber, so that air or gas mixture can be introduced into the distributing chamber without having to pass the crank case, whereby the partial vacuum in the distributing chamber is neutralized. The volume of the crank case 5 should be as small as possible so that a good volumetric efficiency is obtained.

A motor of the type in question will however be exceedingly sensitive to oscillations of the burnt gases in the exhaust conduit. The speedier the scavenging takes place, the more violent will be the oscillations in the exhaust conduit, and these oscillations at certain speeds have a disadvantageous influence on the efficiency as well as the fuel economy. The oscillations are to a certain extent moderated by opening of the valve 10. The kinetic energy of the exhaust gases are therefore utilized for providing the cylinder with an extra quantity of air or gas in addition to the quantity supplied by the compressor. It is however impossible to quench the oscillating movements in the exhaust system only by means of the valve 10 and furthermore this would not prove economically advantageous in motors driven by gas mixture.

The oscillations in the exhaust conduit in motors of this type can assume such a force and rapidity that air or gas mixture may even flow back to the distributing chamber during the scavenging period before the valves can close at speeds critical for the oscillation of the gases. When this takes place, the efficiency decreases considerably and explosions occur in the distributing chamber when a gas mixture is introduced to the same.

Attempts have therefore been made to prevent the combustion gases from reversing their direction of movement in the exhaust conduit through providing the exhaust conduit with a one-way valve or the like. In motors running at high speeds it is difficult to get such arrangements to function satisfactorily. The inertia of such devices prevents the exhaust of the gases, which should take place as easily as possible in order to obtain the greatest possible vacuum in the cylinder with the aid of the kinetic energy of the exhaust gases.

The higher the exhaust ports, the greater are the inconveniences caused by the oscillation in the exhaust conduit and the cylinder. This is illustrated in Fig. 2.

The curves shown in Fig. 2 refer to a motor having a cylinder volume of 350 cm.³ and designed according to the invention. The total volume of the distributing chamber and the connecting channel is 600 cm.³. The outlet conduit had a volume of 10 times the cylinder volume, which proved to be convenient.

The curve 11 indicates the brake efficiency in H. P. for a motor designed according to the invention at a speed of $n$ revolutions per minute, the height of the exhaust ports being 8% of the length of the stroke of the piston. This curve is even and with this height of ports the gas oscillations have no disadvantageous effect on the efficiency. The curves 12, 13, 14, and 15 indicate the brake efficiency in H. P. for a height of the exhaust ports of respectively 16, 18, 20, and 24% of the length of stroke.

The height of the ports has hereby been measured from the top edge of the piston or that part of the height of the ports which is laid free by the piston, when the ports for foundry technical reasons extend below the upper edge of the piston, when the piston is in its lower end position.

From the curves shown in Fig. 2 it appears that the lower the height of the ports, the less will be the influence of the oscillations in the exhaust system on the brake efficiency curve of the motor. At heights of ports of up to 16% or somewhat above this figure the gas oscillations do not cause any disadvantageous effect of practical importance on the efficiency of the motor. At 18%, on the other hand, a substantial reduction of the efficiency occurs at speeds between 1200 and 2400 R. P. M., and this reduction will be greater, the higher the ports. At a height of ports of 24% of the length of stroke it was not possible even when running the machine idle, to attain more than 1600 to 1700 R. P. M.

For other cylinder volumes or other volumes of the distributing chamber and the connecting channel the critical speed of the gas oscillations is reached with other heights of ports and other speeds. The disadvantages caused by these oscillations can however from case to case be eliminated in the manner described above.

In the course of the tests mentioned above the length of the exhaust conduit was varied. With low ports the length of the exhaust conduit did not to any substantial degree influence the efficiency, provided the length of the conduit was not less than 1 to 1.5 m. With high ports it was not possible to obviate the disadvantageous effect of the oscillation of the gases by varying the length of the exhaust conduit, at least not with lengths of the exhaust conduit tested during the experiments, namely between 1 m. and 3.5 m.

When using low exhaust ports, the inlet valves are still open at high speeds when the piston closes the exhaust ports. A partial vacuum is then caused in the cylinder, and air or gas mixture flows into the same through the valve openings from the distributing chamber until the pressure in the cylinder is equal to that in the distributing chamber. Hereby the escape of air or gas through the exhaust ports is obviated, and motors of this type therefore attain good efficiency and low fuel consumption. Low exhaust ports also make it possible to overcharge the cylinder, without risking escape or air or gas mixture to any considerable extent through the exhaust ports.

It is also of great importance in motors of this type that the exhaust gases, when the outlet ports are low, can escape into the exhaust conduit with the least possible resistance, it hereby being essential to ensure great speed of the exhaust gases, whereby a high degree of vacuum is obtained in the cylinder. In order to facilitate the escape of the exhaust gases from the cylinder, the outlet ports are disposed around the whole of the circumference of the cylinder. Two collecting mains 16 and 17 shown in Fig. 3 are disposed one at each side of the cylinder 2, through which the exhaust gases are conducted to a common outlet conduit 18, in which the combustion gases guided by the wall 19 are given a substantially parallel movement before they flow out in the exhaust conduit. In this manner the forming of eddies in the outlet conduit and the consequent loss of speed are avoided.

Tests made with the abovementioned motor have also shown that the efficiency developed amounted to only 4.2 H. P. at 2600 R. P. M., when only the compression pressure generated by the crank case compressor acted on the inlet valves in the cylinder top, a silencer being in the usual manner connected to the cylinder. The efficiency increased to 11 H. P. at the same speed, when an exhaust conduit of 1.4 meters in length was provided between the cylinder and the silencer.

The test motor gives an efficiency of no less than 25 H. P. per liter cylinder volume at such a low speed as 2000 R. P. M., which must be considered as a very good result.

Having now particularly described and ascertained the nature of my invention and in what manner the same is to be performed, I declare that what I claim is:

1. In a two-stroke motor having a cylinder and a piston reciprocable therein, a distributing chamber and a spring-controlled, self-acting admission valve for putting the distributing chamber into communication with the cylinder, a compressing device, valve means for putting the compressing device into intermittent communication with the distributing chamber, there being an exhaust port in the wall of the cylinder, an exhaust conduit connected to the exhaust port, the said exhaust conduit being so proportioned as to cause oscillation in the exhaust gases for creating a partial vacuum in the cylinder, the admission valve and the compressing device being so coordinated that the pressure from the compressing device is caused to act upon the admission valve to open the said admission valve before the creation of the partial vacuum in the cylinder.

2. In a two-stroke motor having a cylinder, a piston reciprocable in said cylinder, a distributing chamber and a spring-controlled, self-acting admission valve for putting the distributing chamber into communication with the cylinder, a compressing device comprising a crank case having valve means for admitting air to said crank case and valve means for putting the crank case into intermittent communication with the distributing chamber, the cylinder having an exhaust port, an exhaust conduit connected to the exhaust port, the said exhaust conduit being so proportioned as to cause oscillations in the exhaust gases for creating a partial vacuum in the cylinder, the admission valve and the compressing device being so coordinated that the pressure from the compressing device is caused to act upon the admission valve to open the said admission valve before the creation of the partial vacuum in the cylinder.

3. In a two-stroke motor having a cylinder, a piston reciprocable in said cylinder, a distributing chamber and a spring-controlled, self-acting admission valve for putting the distributing chamber into communication with the cylinder, a compressing device, valve means for putting the compressing device into intermittent communication with the distributing chamber, there being an exhaust port in the wall of said cylinder, an exhaust conduit connected to the exhaust port, the said exhaust conduit being so proportioned as to cause oscillation in the exhaust gases for creating a partial vacuum in the cylinder, the admission valve and the compressing device being so coordinated that the pressure from the compressing device is caused to act upon the admission valve to open the said admission valve before the creation of the partial vacuum in the cylinder and the admission valve and the exhaust port being so coordinated that the exhaust port closes before the admission valve.

4. In a two-stroke motor having a cylinder and a piston reciprocable therein, a distributing chamber and a spring-controlled, self-acting admission valve for putting the distributing chamber into communication with the cylinder, a compressing device, valve means for putting the compressing device into intermittent communication with the distributing chamber, there being an exhaust port in the wall of said cylinder, the height of the exhaust port not exceeding 16% of the length of the stroke of the piston, an exhaust conduit connected to the exhaust port, the said exhaust conduit being so proportioned as to cause oscillation in the exhaust gases for creating a partial vacuum in the cylinder, the admission valve and the compressing device being so coordinated that the pressure from the compressing device is caused to act upon the admission valve to open the said admission valve before the creation of the partial vacuum in the cylinder.

5. In a two-stroke motor having a cylinder and a piston reciprocable therein, a distributing chamber and a spring-controlled, self-acting admission valve for putting the distributing chamber into communication with the cylinder, a compressing device, valve means for putting the compressing device into intermittent communication with the distributing chamber, a check valve opening inwardly into the distributing chamber and being capable of opening when the pressure in the distributing chamber is lower than the atmospheric pressure, there being an exhaust port in the wall of the cylinder, an exhaust conduit connected to the exhaust port, the said exhaust conduit being so proportioned as to cause oscillation in the exhaust gases for creating a partial vacuum in the cylinder, the admission valve and the compressing device being so coordinated that the pressure from the compressing device is caused to act upon the admission valve to open the said admission valve before the creation of the partial vacuum in the cylinder.

6. In a two-stroke motor having a cylinder and a piston reciprocable therein, a distributing chamber and a spring-controlled, self-acting admission valve for putting the distributing chamber into communication with the cylinder, a compressing device, valve means for putting the compressing device into intermittent communication with the distributing chamber, there being an exhaust port in the wall of the cylinder, means for closing and opening said port, an exhaust conduit connected to the exhaust port, the said exhaust conduit being so proportioned as to cause oscillation in the exhaust gases for creating a partial vacuum in the cylinder, the said exhaust conduit and the port being so dimensioned relatively to each other that the ports close at the moment when the pressure at the ports due to the oscillations in the exhaust gases is approximately at the minimum, and the admission valve and the compressing device being so coordinated that the pressure from the compressing device is caused to act upon the admission valve to open the said admission valve before the creation of the partial vacuum in the cylinder.

KARL ERIK KYLÉN.